United States Patent [19]
Olney

[11] Patent Number: 5,452,753
[45] Date of Patent: Sep. 26, 1995

[54] VEHICLE TIRE MANAGEMENT SYSTEM INCLUDING WHEEL WITH SELF-CONTAINED TIRE INFLATION/DEFLATION APPARATUS

[75] Inventor: Ross D. Olney, West Hills, Calif.

[73] Assignee: Hughes Aircraft Company, Los Angeles, Calif.

[21] Appl. No.: 52,344

[22] Filed: Apr. 22, 1993

[51] Int. Cl.⁶ ................................ B60C 23/00
[52] U.S. Cl. ........................... 152/417; 417/233
[58] Field of Search .................. 152/415, 418, 152/208, 419, 420, 421, 422; 417/211, 233

[56] References Cited

U.S. PATENT DOCUMENTS

| | | | |
|---|---|---|---|
| 1,128,455 | 2/1915 | Keith | 152/418 |
| 1,338,337 | 4/1920 | Stonestreet | 152/418 |
| 1,423,607 | 7/1922 | Groat | 417/233 |
| 2,127,152 | 8/1938 | Boone | 417/233 |
| 2,506,677 | 5/1950 | McKenna | 152/422 |
| 2,623,472 | 12/1952 | Raymond | 152/420 |
| 2,781,813 | 2/1957 | Ferguson | 152/208 |
| 2,939,504 | 6/1960 | Bedford, Jr. | 152/418 |
| 4,067,376 | 1/1978 | Barabino | 152/418 |
| 4,289,187 | 9/1981 | Rivin | 152/418 |
| 4,742,857 | 5/1988 | Gandhi | 152/418 |
| 4,938,272 | 7/1990 | Sandy, Jr. et al. | 152/427 |

FOREIGN PATENT DOCUMENTS

| | | |
|---|---|---|
| 0166123 | 2/1986 | European Pat. Off. |
| 1011756 | 4/1957 | Germany |
| 8715177 | 7/1988 | Germany |
| 156706 | 12/1980 | Japan ............ B60C/23/00 |

Primary Examiner—Michael W. Ball
Assistant Examiner—Francis J. Lorin
Attorney, Agent, or Firm—V. D. Duraiswamy; Wanda Denson-Low

[57] ABSTRACT

A high pressure air reservoir, a pump unit and an air pressure sensor are provided on each wheel of a motor vehicle. The sensor senses the air pressure in a tire which is mounted on the respective wheel. The pump unit is controllable to selectively pump air from the tire into the reservoir to deflate the tire, or to cause air to flow from the reservoir into the tire to inflate the tire. A control unit which displays the sensed air pressure and controls the pump unit to inflate or deflate the tire is mounted inside the vehicle for operation by the driver, and is electrically connected to the sensor and pump unit by brush contacts provided between the wheel and axle or inductive coils provided between the wheel and an adjacent structural member of the vehicle.

9 Claims, 4 Drawing Sheets

VEHICLE TIRE MANAGEMENT SYSTEM INCLUDING WHEEL WITH SELF-CONTAINED TIRE INFLATION/DEFLATION APPARATUS

BACKGROUND OF THE INVENTION

1. Field of the Invention

The present invention generally relates to motor vehicles, and more specifically to a tire pressure management system for sensing and controlling the air pressure in the tires of a motor vehicle.

2. Description of the Related Art

The pressure to which the tires of a motor vehicle should be optimally inflated depends on the type of terrain over which the vehicle is to be driven. The pressure should be relatively high for hard surfaces such as paved roads, and relatively low for soft surfaces such as wet mud or loose sand.

It is possible to adjust the pressures in the individual tires to a desired value by stopping and exiting the vehicle, manually inflating the tires with a pump to increase the pressure or manually deflating the tires by opening the valves and allowing air to escape to decrease the pressure.

However, this operation is inconvenient and time consuming, and is especially undesirable in inclement weather or in an otherwise hostile environment. It also suffers from the serious disadvantage that it cannot be performed while the vehicle is moving.

U.S. Pat. No. 4,938,272, entitled "VALVE ACTUATOR FOR TIRE PRESSURE MANAGEMENT", issued Jul. 3, 1990 to W. Sandy, Jr. et al, discloses a system including an air pump or compressor mounted on the vehicle body, and conduits leading from the compressor to valves provided in the vehicle wheels. The valves are remotely actuated by the operator from inside the vehicle to connect the compressor to the tires for inflation, or to connect the tires to the atmosphere for deflation.

A disadvantage of Sandy's system is that a high pressure air connection including rotating wheel bearing air seals must be made between the conduits leading from the compressor and the rotating wheels. Such connections are difficult to construct and maintain, and a failure of the connections or valves will result in catastrophic deflation of the tires.

U.S. Pat. No. 4,742,857, entitled "TIRE PRESSURE SENSOR AND AIR SUPPLY TO MAINTAIN DESIRED TIRE PRESSURE", issued May 10, 1988, to S. Ghandhi discloses a system including a high pressure reservoir and a controller valve provided on each wheel. The valves include pressure sensors which are connected to a display on a control unit mounted inside the vehicle. The valves are remotely actuated by the operator from inside the vehicle to connect the reservoirs to the tires for inflation, or to connect the tires to the atmosphere for deflation.

Although Ghandi's system eliminates the high pressure rotary air connections of Sandy's system, the high pressure reservoirs must be periodically replenished from outside the vehicle. This limits the operating range of the vehicle and the number of times it can transition between operating conditions requiring different tire pressures. In addition, the valves are exposed to the atmosphere, and can be contaminated by dirt, sand or other ambient matter.

SUMMARY OF THE INVENTION

A tire pressure management system for a motor vehicle embodying the present invention includes a high pressure air reservoir, a pump unit, and an air pressure sensor provided on each wheel of the motor vehicle. The sensor senses the air pressure in a tire which is mounted on the respective wheel.

The pump unit is controllable to selectively pump air from the tire into the reservoir to deflate the tire, or to pump air from the reservoir into the tire to inflate the tire.

A control unit which displays the sensed air pressure and controls the pump to inflate or deflate the tire is mounted inside the vehicle for operation by the driver, and is electrically connected to the sensor and pump unit by brush contacts provided between the wheel and axle or inductive coils provided between the wheel and an adjacent structural member.

The present tire pressure management system does not require high pressure rotary air connections or external means for replenishing the air in the reservoirs. The system, is self-contained, and immune from contamination by the environment.

Since the air is moved between the tires and reservoirs for changing the tire pressure, no air is discharged into the atmosphere and the tire pressures can be changed an indefinite number of times without external replenishment of air being required. The tire pressure can be changed quickly since the reservoirs are located in close proximity to the tires.

The present tire pressure management system does not require high pressure rotary air connections or external means for replenishing the air in the reservoir.

In addition, the present system includes a build-in safety feature in that if a valve in the pump unit were to fail in the open position, the tire pressure would be restored to a normal operating value rather than being catastrophically deflated.

DETAILED DESCRIPTION OF THE INVENTION

Figure 1:
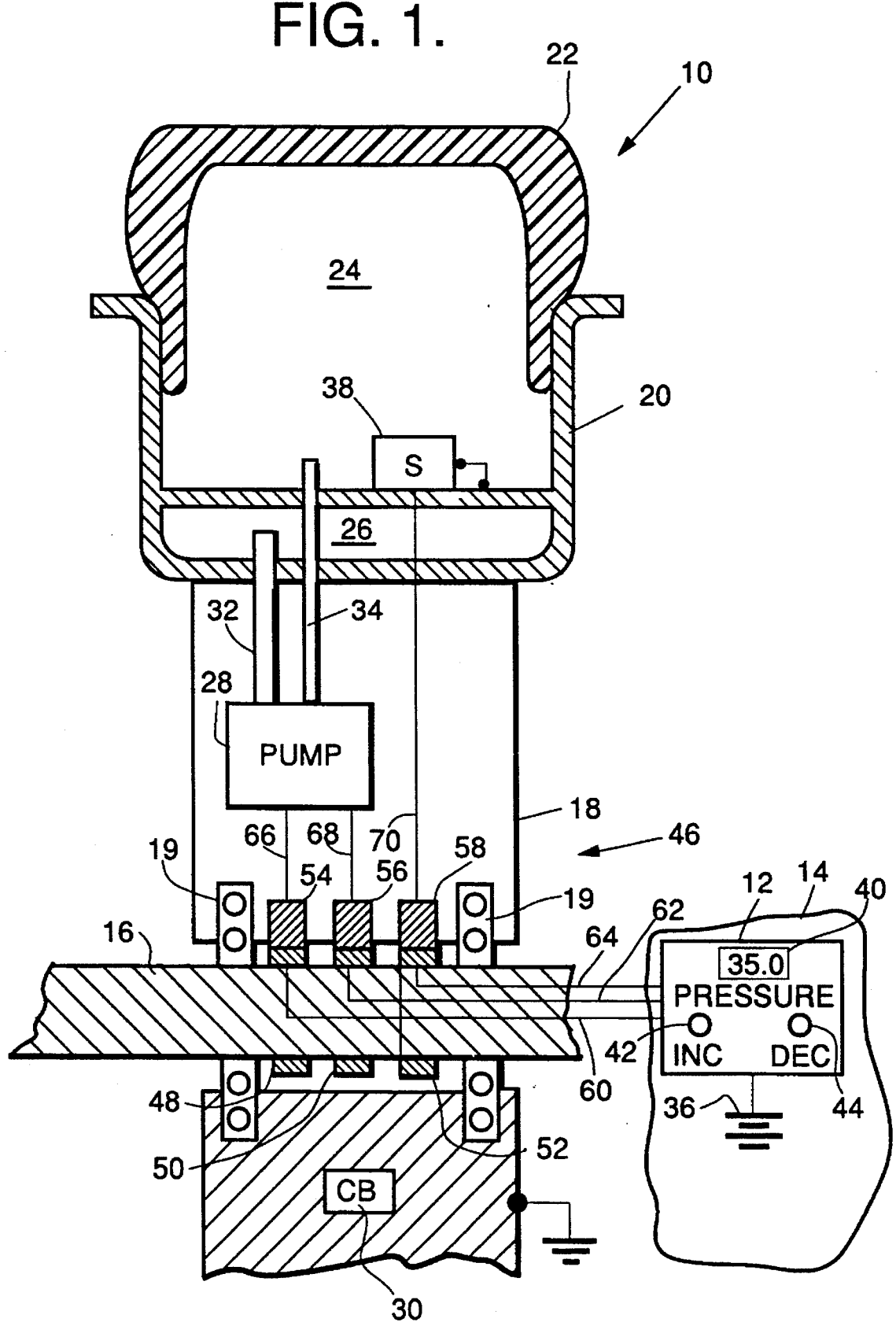
FIG. 1 is a simplified vertical sectional view illustrating a first embodiment of a vehicle tire pressure management system according to the present invention.

A tire pressure management system 10 for a motor vehicle is illustrated in FIG. 1. The system 10 includes a control unit 12 which is provided on a dashboard or other location in a driver's compartment 14 or other suitable location which is accessible without exiting the vehicle.

The vehicle includes a plurality of axles, generally four, on which identical wheels with air-inflatable tires are mounted. One axle 16 is illustrated in FIG. 1. A wheel 18 is rotatably mounted on the axle 16 by bearings 19, and includes a rim 20 on which a tire 22 is mounted. A tire inflation space 24 is defined between the rim 20 and the interior of the tire 22.

A high pressure air reservoir 26 is formed in the wheel 18, preferably in the rim 20 as illustrated. A compressor or pump 28 is formed or mounted in the wheel 18, preferably as close to the axle 16 as possible to minimize the moment of inertia. A counterbalance 30 is provided in the wheel 18 at a position which is diametrically opposed to the pump 28 to eliminate the wheel imbalance created by the pump 28.

The pump 28 has one port connected to the reservoir 26 through a conduit 32, and another port connected to the inflation space 24 inside the tire 22 through a conduit 34. The pump 28 is a bi-directional unit, capable of selectively pumping air in either direction, and is electrically driven by a battery 36 of the vehicle through the control unit 12.

An air pressure sensor 38 is mounted on the rim 20 inside the inflation space 24 and feeds an electrical signal corresponding to the sensed tire air pressure to the control unit 12.

The control unit 12 includes a display 40 for displaying the tire pressure as sensed by the sensor 38, a switch or button 42 for increasing the tire pressure and a switch or button 44 for decreasing the tire pressure. Although only one display 40, button 42 and button 44 are illustrated in the drawing, the display unit 12 preferably includes an individual display 40 and buttons 42 and 44 for each wheel of the vehicle.

The button 42 is depressed to increase the tire pressure from the value indicated on the display 40. This causes the pump 28 to pump air from the reservoir 26 through the conduits 32 and 34 into the space 24 to inflate the tire 22. The button 44 is depressed to decrease the tire pressure from the value indicated on the display 40. This causes the pump 28 to pump air from the space 24 through the conduits 34 and 32 into the reservoir 26 to deflate the tire 22.

The control unit 12 is connected to the sensor 38 and pump 28 by an interconnection unit 46 including electrical contacts in the form of annular rings 48, 50 and 52 provided on the outer periphery of the axle 16. Conjugate electrical contacts in the form of brushes 54, 56 and 58 are provided on the inner periphery of the wheel 18, and make direct electrical contact with the rings 48, 50 and 52 respectively.

The rings 48, 50 and 52 are connected to the control unit 12 through lines 60, 62 and 64. The brushes 54 and 56 are connected to the pump 28 through lines 66 and 68, whereas the brush 58 is connected to the sensor 38 through a line 70. Although not illustrated in detail, the rings 48, 50 and 52, brushes 54, 56 and 58 and lines 60, 62, 64, 66, 68 and 70 are electrically insulated from the axle 16 and wheel 18.

The axle 16, wheel 18 and the negative terminal of the battery 36 are connected to the chassis of the vehicle which is designated as ground. One end of the sensor 38 is connected to the rim 20, and thereby to ground. This provides a complete circuit path between the sensor 38 and the control unit 12 via the line 70, brush 58, ring 52, line 64 and ground return.

The pump 28 includes an electric motor including a winding (not shown) having one end connected to the control unit 12 through the line 66, brush 54, ring 48 and line 60, and an opposite end connected to the control unit 12 through the line 68, brush 56, ring 50 and line 62.

The control unit 12 energizes the pump 28 to pump air from the reservoir 26 into the inflation space 24 by connecting the positive end of the battery 36 to the line 60 and the negative end (ground) of the battery 36 to the line 62. The pumping direction is reversed to pump air from the inflation space 24 into the reservoir 26 by connecting the positive end of the battery 36 to the line 62 and the negative end of the battery 36 to the line 60.

The control unit 12 can include a separate display 40 and buttons 42 and 44 for each tire of the vehicle, or a switch (not shown) for switching the single display 40 and buttons 42 and 44 between the tires. If the pressures in the tires are maintained approximately equal, the pressure in only one tire can be sensed, and only one display 40 and buttons 42 and 44 can be provided. In this case, the buttons 42 and 44 are connected to cause inflation or deflation of all of the tires together.

It is further within the scope of the invention to sense the pressures in all of the tires, compute and display the average thereof, and inflate or deflate all of the tires together based on the displayed average pressure.

As yet another alternative, the control unit 12 can be designed to automatically, rather than manually, regulate the pressures in the tires to a value set on the display 40. In this case, the buttons 42 and 44 are used to slew the display 40 up or down to the desired value of pressure.

Figure 2:
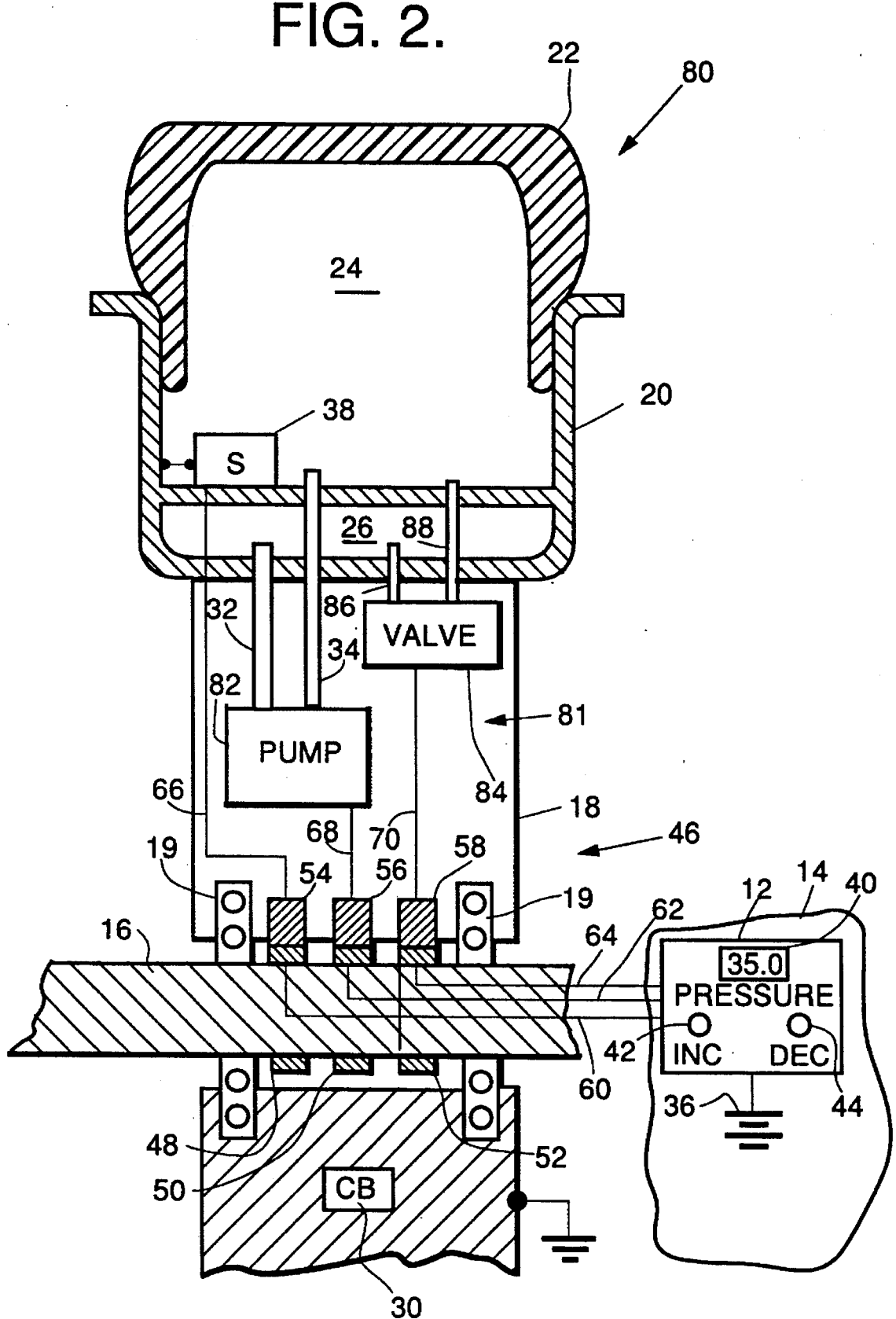
FIG. 2 is similar to FIG. 1, but illustrates a second embodiment of the system.

FIG. 2 illustrates another tire pressure management system 80 embodying the invention in which the bi-directional pump 28 is replaced with a pump unit 81 including a uni-directional pump 82 and a valve 84. The valve 84 has one port connected to the reservoir 26 through a conduit 86 and another port 88 connected to the inflation space 24 of the tire 22 through a conduit 88. It will be noted that the conduits 32,34 and 86,88 are connected in parallel with each other between the inflation space 24 and reservoir 26.

The control unit 12 is connected to the sensor 38 via the lines 60 and 66. The pump 82 is energized via an electrical signal applied through the lines 62 and 68 to pump air from the inflation space 24 into the reservoir 26 to deflate the tire 22 and decrease the pressure in the space 24. The valve 84, which is normally closed, is opened via an electrical signal applied through the lines 64 and 70 to allow air to flow from the reservoir 26 into the space 24 to inflate the tire 22 and increase the pressure in the space 24.

The present tire pressure management systems 10 and 80 do not require high pressure rotary air connections or external means for replenishing the air in the reservoir 26. The systems 10 and 80 are self-contained, and immune from contamination by the environment.

Since the air is moved between the tire 22 and reservoir 26 for changing the tire pressure, no air is discharged into the atmosphere and the tire pressure can be changed an indefinite number of times without external replenishment of air being required. The tire pressure can be changed quickly since the reservoir 26 is located in close proximity to the tire 22.

The combined volume of air in the space 24 and reservoir 26 is selected to be such that if the valve 84 in the system 80 is opened long enough for the pressures in the space 24 and reservoir 26 to equalize, the pressure will be approximately equal to, preferably slightly greater than, a normal operating pressure of the tire 22. Thus, even if the valve 84 fails in the open position, the tire 22 will not be catastrophically deflated.

Figure 3:
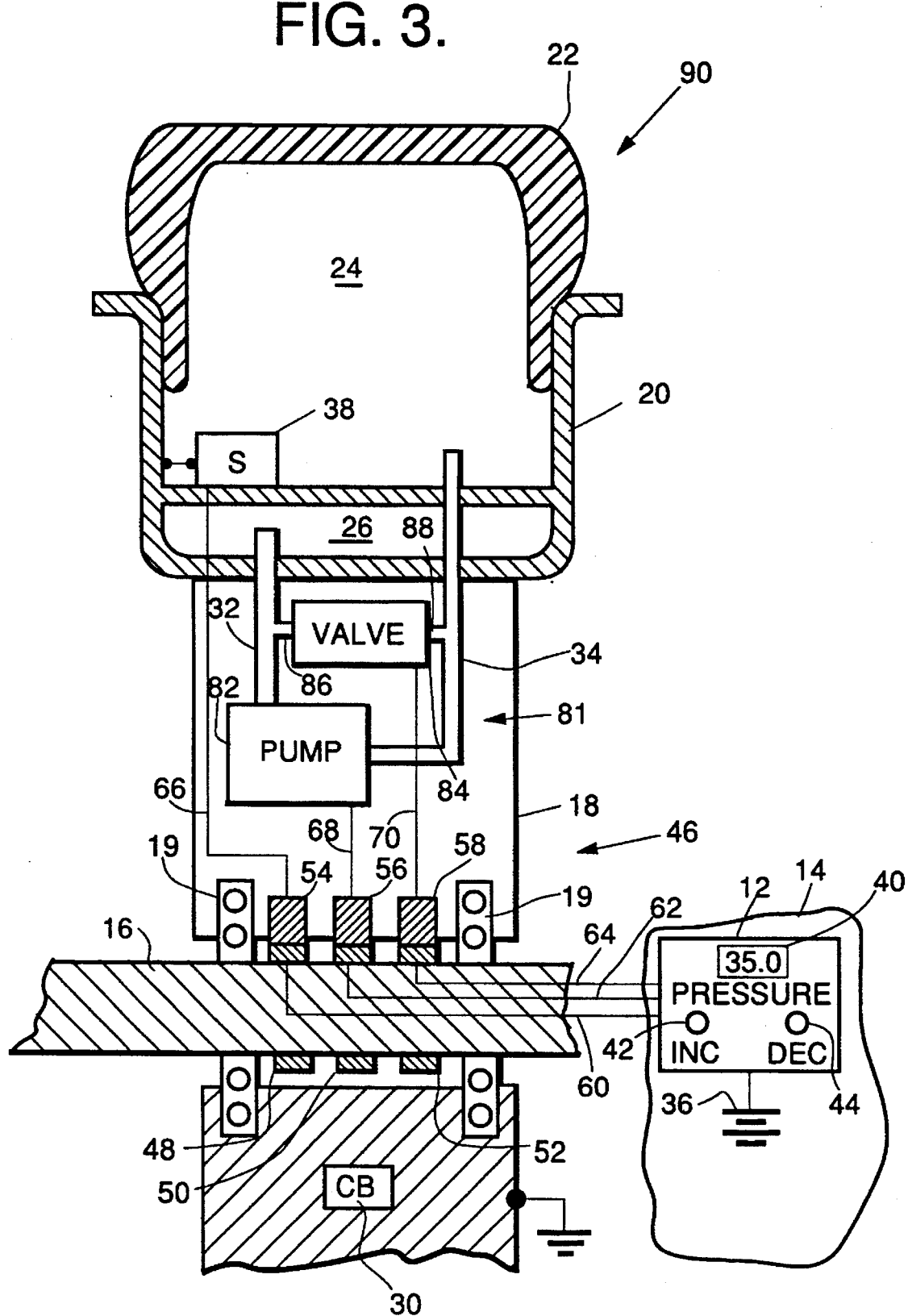
FIG. 3 is also similar to FIG. 1, but illustrates a third embodiment of the system.

FIG. 3 illustrates another tire pressure management system 90 which is similar to the system 80 except that the conduits 86 and 88 are connected to the conduits 32 and 34 rather than to the reservoir 26 and space 24 respectively. In this case, the pump 82 and valve 84 are connected in parallel between the conduits 32 and 34.

In the systems illustrated in FIGS. 1 to 3, the control unit 12 is connected to the pressure sensor 38 and pump 28 or pump unit 81 by direct electrical contacts. It is further within the scope of the invention to interconnect these elements by indirect inductive coupling as illustrated in FIGS. 4 and 5.

Figure 4:
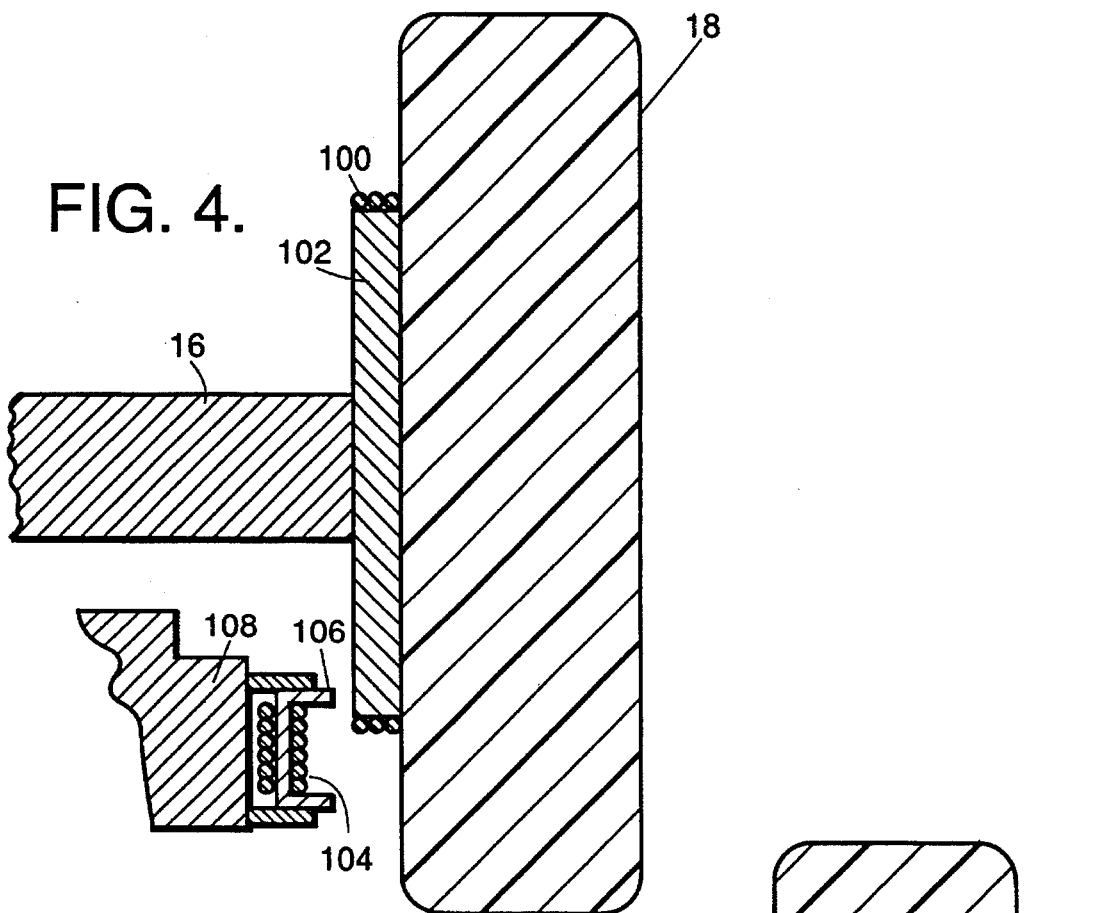
FIG. 4 is a simplified vertical sectional view illustrating an alternative electrical interconnection arrangement of the present system.

As illustrated in FIG. 4, an annular electrical coil 100 is wound around a core 102 which is coaxially fixed to the wheel 18. Another electrical coil 104 is wound around a C-shaped core 106 which is mounted on a fixed structural member 108 of the vehicle.

The coil 100 is connected to the sensor 38 and pump 28 or pump unit 81, whereas the coil 104 is connected to the control unit 12. The coils 100 and 104 are continuously inductively coupled together such that AC or pulsed DC signals can be transmitted therebetween for sensing and changing the tire pressure. The signals can be frequency or time multiplexed, or separated from each other in any other known manner.

Figure 5:
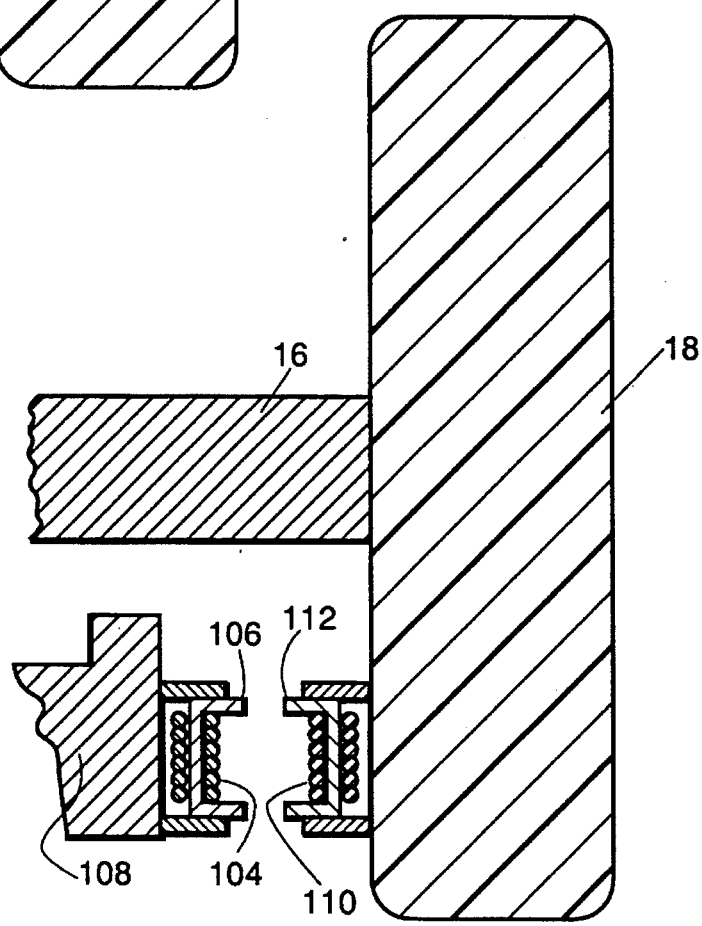
FIG. 5 is similar to FIG. 4, but illustrates another electrical interconnection arrangement.

FIG. 5 illustrates another arrangement for inductive signal coupling. In this case, the coil 100 is replaced by a coil 110 which is wound around a C-shaped core 112. Whereas the coils 100 and 104 of FIG. 4 are continuously inductively coupled together, the coil 110 aligns with the coil 104 only once per revolution of the wheel 18 relative to the member 108. The arrangement of FIG. 5 is advantageous in that the coupling efficiency in the aligned position is much greater than be attained with the arrangement of FIG. 4.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A tire management system for a vehicle including a wheel on which an air-inflatable tire is mounted with an internal tire pressure, comprising:

an air reservoir provided on the wheel independent of the tire and maintained at a reservoir pressure greater than the tire pressure; and a bidirectional pump on the wheel for selectively pumping air from the tire into the higher pressure reservoir for deflating the tire, and for pumping air from the reservoir into the lower pressure tire for inflating the tire.

2. A system as in claim 1, in which the reservoir is integral with the wheel.

3. A system as in claim 1, further comprising a sensor provided on the wheel for sensing said air pressure in the tire.

4. A system as in claim 3, further comprising:

an electrical power source;

a control unit provided on the vehicle for displaying said air pressure sensed by the sensor; and an electrical interconnection unit for electrically interconnecting the control unit to control the application of said electrical power source to the sensor and the bidirectional pump.

5. A system as in claim 4, in which:

the vehicle includes an axle on which the wheel is rotatably mounted; and the interconnection unit includes:

first electrical contacts which are provided on an inner periphery of the wheel; and second electrical contacts which are provided on an outer periphery of the axle and electrically engage with respective first electrical contacts.

6. A system as in claim 5, in which the first electrical contacts include brushes.

7. A system as in claim 4, in which:

the vehicle includes a structural member relative to which the wheel is rotatable; and the interconnection unit includes:

a first electrical coil which is provided on the structural member; and a second electrical coil which is provided on the wheel and inductively couples with the first electrical coil.

8. A vehicle wheel on which an air-inflatable tire is mounted, comprising:

a rim for mounting the tire;

an air reservoir that is independent of the tire and is maintained at a reservoir pressure greater than the tire pressure; and a bidirectional pump for selectively pumping air from the tire into the higher pressure reservoir for deflating the tire, and for pumping air from the reservoir into the lower pressure tire for inflating the tire.

9. A wheel as in claim 8, further comprising a sensor for sensing the air pressure in the tire.

* * * * *